United States Patent [19]

Vogl et al.

[11] Patent Number: 5,870,493
[45] Date of Patent: Feb. 9, 1999

[54] TOP DOWN PREPROCESSOR FOR A MACHINE VISION SYSTEM

[75] Inventors: Thomas P. Vogl, Bethesda; Kim T. Blackwell, Wheaton; Daniel L. Alkon, Bethesda, all of Md.

[73] Assignees: The United States of America as represented by the Department of Health and Human Services, Washington, D.C.; ERIM, International, Inc., Ann Arbor, Mich.

[21] Appl. No.: 819,142

[22] Filed: Mar. 17, 1997

Related U.S. Application Data

[63] Continuation of Ser. No. 204,943, Mar. 2, 1994, abandoned.

[51] Int. Cl.$^6$ .............................. G06K 9/36; G06K 9/46
[52] U.S. Cl. ........................ 382/195; 382/288; 382/295
[58] Field of Search ................................... 382/295, 156, 382/195, 205, 288, 302, 276, 261, 190

[56] References Cited

U.S. PATENT DOCUMENTS

| | | | |
|---|---|---|---|
| 4,599,693 | 7/1986 | Denenberg | 382/160 |
| 4,958,939 | 9/1990 | Samad | 382/295 |
| 5,263,107 | 11/1993 | Ueda et al. | 382/157 |

OTHER PUBLICATIONS

"Neocognition: A Hierarchical Neural Network Capable of Visual Pattern Recognition," K. Fukushima, *Neural Networks*, vol. 1, pp. 119–130, 1988.

"Computer Generation Of Fractional Brownian Noise," Leigh Harrington, ERIM Techical Report #C558301–1–T, Jul. 1988.

"Theory of Communication," Gabor, *J. Inst. Elec. Eng.*, 93:429–459, 1946.

Calway et al. "Curve Extraction in Images using the Multiresolutional Fourier Transform." ICASSP 90, vol. 4, pp. 2129–2132, Apr. 1990.

Calway, "Image Analysis using a Generalized Wavelet Transform," IEE Colloquim on Applications of Wavelet Transforms in Image Processing, four pages, Jan. 1993.

Manjunath et al. "A Computational Approach to Boundary Detection." Proceedings 1991 IEEE Computer Society Conference on Computer Vision and Pattern Recogntion, pp. 358–363, Jun. 1991.

Chang et al. "A Wavelet Transform Approach to Texture Analysis." ICASSP 92, vol. 4, pp. 661–664, Mar. 1992.

Meystel et al. "Top–down/bottom–up Algorithm for Adaptive Multiresolutional Representation of Gray–Level Images." Proceedings of SPIE, vol. 1904, pp. 70–84, Feb. 1993.

Jolion, "A Hierarchical Framework for Robust Extraction and Delineation of Geometric Features." *Pattern Recognition.* vol. 26, No. 9, 1993, pp. 1295–1304.

Viard–Gaudin et al. "A Multi–Resolution Approach to Extract the Address Block on Flat Mail Pieces". ICASSP '91, vol. 4, Apr. 1991, pp. 2701–2704.

Neural Networks, vol. 2, No, 1, 1989 Elmsford, NY, USA, Michael Seibert and Allen M. Waxman, 'Spreading Activation Layers . . . Recognition Systems', pp. 22–23.

1993 IEEE International Conference on Neural Networks, San Francisco, CA, USA, 28 Mar. 1993, pp. 399–406, Keiji Yamada, Inverse Recall . . . Pattern Recognition.

Proceedings of the International Joint Conference on Neural Network (IJCNN), Seattle, WA, USA, Jul. 8–12, 1991, vol. 1, 8, Jul. 1991, Inst. of Electronics Engineers, pp. 695–700, 'Methods for Enhancing Neural Network Handwritten Character Recognition'.

(List continued on next page.)

*Primary Examiner*—Jon Chang
*Attorney, Agent, or Firm*—Spencer & Frank

[57] ABSTRACT

An image recognition and classification system includes a preprocessor in which a "top–down" method is used to extract features from an image; an associative learning neural network system, which groups the features into patterns and classifies the patterns: and a feedback mechanism which improves system performance by tuning preprocessor scale, feature detection, and feature selection.

17 Claims, 5 Drawing Sheets

OTHER PUBLICATIONS

IJCNN Intl. Joint Conference on Neural Networks, vol. 3, 7 Jun. 1992, Baltimore, MD, USA, pp. 760–768, Sukhan Lee and Yeongwoo Choi, 'Robust Recognition of Handwritten Numerals . . . Cooperative Network'.

Pattern Recognition, vol. 25, No. 6, Jun. 1992, pp. 655–666. Blackwell, et al., 'A New Approach to Hand–Written Character Recognition'.

IEEE Transactions on Systems, Man and Cybernetics, vol. 23, No. 6, Nov. 1993–Dec. 1993,, NY, NY, USA, pp. 1672–1682, G.W. Rogers et al., A Self Organizing Network . . . Conditional Class Probability.

Fukushima "Neocognition: A Hierarchal Neural Network Capable Of Visual . . . ", *Neural Networks,* 1:119–30, 1988.

Gabor "Theory of Communications", *J. Inst. Elec. Eng.,* 93:429–59, 1946.

Harrington "Computer–Generation of Fractional Brownian Noise", *ERIM Technical Report,* No. c58501–1–T, 1989.

Rosenfeld, "Multiresolution Image Processing And Analysis", Springer–Verlag, Berlin, (1984) Table of Contents only.

Alkon et al., "Biological Plausability Of Artificial Neural Networks: Learning By Non–Hebbian Synapses", *Biological And Psychological Connections,* pp. 31–49, (1993).

Daugman, "Uncertainty Relation For Resolution In Space, Spatial Frequency, And Orientation Optimized By Two–Dimensional Visual Cortical Filters", *J. Opt. Soc. Am.,* vol. 2:1160–1169, (1985).

Desimone, "Face–Selective Cells in The Temporal Cortex Of Monkeys", *Journal Of Cognitive Neuroscience,* vol. 3:1–8, (1991).

Funahashi et al., "Dorsolateral Prefrontal Lesions And Oculomotor Delayed–Response Performance: Evidence For Mnemonic Scotomas", *The Journal of Neuroscience,* vol. 13:1479–1497, (1993).

Gilbert, "Laminar Differences In Receptive Field Properties Of Cells In Cat Primary Visual Cortex", *J. Physiol.,* vol. 268:391–421, (1977).

Grossberg, "Neural Dynamics Of 1–D and 2–D Brightness Perception: A Unified Model Of Classical And Recent Phenomena", *Perception & Psychophysics,* vol. 43:241–277, (1988).

Hubel et al., "Receptive Fields, Binocular Interaction And Functional Architecture In The Cat's Visual Cortex", *J. Physiol.,* vol. 160:106–154, (1962).

Hubel et al., "Receptive Fields And Functional Architecture In Two Nonstriate Visual Areas (18 and 19) Of The Cat", *J. Neurophysiology,* vol. 28:229–289, (1965).

Jones et al., "An Evaluation Of The Two–Dimensional Gabor Filter Model Of Simple Receptive Fields In Cat Striate Cortex", *Journal of Neurophysiology,* vol. 58:1233–1258, (1987).

Loomis et al., "Similarity Of Tactual And Visual Picture Recognition With Limited Field Of View", *Perception,* vol. 20:167–177, (1991).

Malik et al., "Preattentive Texture Discrimination With Early Vision Mechanisms", *J. Opt. Soc. Am. A,* vol. 7:923–932, (1990).

Pentland, "From Pixels To Predicates", Ablex Publishing Corporation pp. 1–174, (1986).

Porat et al., "Localized Texture Processing In Vision: Analysis And Synthesis In the Gaborian Space", *IEEE Transactions On Biomedical Engineering,* vol. 36:115–129, (1989).

Wenskay, "Neural Networks: A Prescription For Effective Protection", *The Computer Lawyer,* vol. 8:12–23, (1991).

Sajda et al., "A Neural Network Model Of Object Segmentation And Feature Binding In Visual Cortex", *IEEE,* pp. 43–48, (1992).

TOP DOWN PREPROCESSOR FOR A MACHINE VISION SYSTEM

This application is a continuation of application Ser. No. 08/204,943, filed Mar. 2, 1994 now abandoned.

BACKGROUND

An image recognition and classification system (a machine vision system) includes a preprocessor in which a "top-down" method is used to extract features from an image, an associative learning neural network system which groups the features into patterns and classifies the patterns, and an attentional mechanism which focuses additional preprocessing and a neural network on relevant parts of an image.

Attempts to recognize and classify images have led to construction of automated artificial machine vision systems and to development of strategies to learn patterns in images and to recognize and classify images by using the learned patterns. Those developing artificial systems have continually attempted to incorporate principles of biological systems into their strategies, because biological systems outperform all artificial systems, implemented or proposed, by a wide margin. For example, machine vision systems based on artificial neural networks have been implemented on digital parallel computers, but a parallel implementation only provides an increase in speed without an increase in performance. Thus, the goal of emulating the pattern recognition performance of biological systems still eludes computer scientists.

In order for a biological nervous system to discriminate objects two fundamental problems must be solved: object segmentation and binding. "Object segmentation" deals with distinguishing separate objects; "binding" deals with how specific attributes such as shape and depth, are linked to create an individual object. A question addressed by object segmentation mechanisms is to which overlapping object does a border belong? An image of an object may be occluded (divided) by an overlapping image, and will need to be reconstructed as a whole image. Models have been proposed to explain this process, for example, using artificial neural networks. (Sajda and Finkel, 1992)

During the past half century, the theoretical infrastructure of machine vision systems has developed both top-down (beginning with large features of the image) and bottom-up (beginning at the lowest level of resolution, usually a pixel) views. However, actual development has focused almost exclusively on bottom-up approaches as exemplified by the title of Pentland's illuminating book *From Pixels to Predicates,* and comments therein such as: "Processing is primarily data-driven (i.e., bottom-up), although it can be responsive to the goals and expectations at the higher levels." (Pentland, 1986, part 1, page 1).

Ongoing efforts have focused on the extraction of "features" in an image by local manipulations of small microfeatures (often 3×3 rarely more than 9×9 pixel areas), with the intent of identifying larger features (macro-features) from their combination. The paucity of robust results from this approach may be attributed to several causes, two of the most important of which are (1) that the mathematical operations performed on the small areas are usually differential operators such as edge detectors that enhance rather than reduce noise; and (2) that not even humans are very good at visual recognition when allowed only a small instantaneous field of view. Similarity of tactual and visual picture recognition with limited field of view. Loomis et al. (1991).

During this same time period, cognitive psychologists and neurobiologists have made impressive advances in research on the processing mechanisms that are at work in the visual cortex of mammals, particularly cats and monkeys. Electrophysiological and psychophysical experiments on cats and monkeys demonstrate a wide variety of feature selective cells in the visual cortex. In the mammalian cortex, these include simple cells (Hubel and Weisel, 1962), whose shape is closely approximated by a Gabor function (Daugman, 1985; Jones and Palmer, 1987) or a difference of Gaussian functions; end-stopped cells (often called first order hypercomplex cells) (Hubel & Weisel, 1965; Gilbert, 1977); color sensitive cells; and even cells that respond only to faces. (Desimone, 1991). Face-selective cells in the temporal cortex of monkeys. Desimone (1991).

Complex cells and second order hypercomplex cells (Hubel and Weisel, 1962, 1965) are sensitive to the same features as simple and first order hypercomplex cells, respectively. One of the differences among these cells, of interest in the context of feature extraction from static images, is that the complex and second order hypercomplex cells have larger receptive fields than simple cells, and are insensitive to location of micro-features within their receptive fields.

In the development of artificial systems, preprocessing of data derived from an image has been used to extract features from an image and to select features for further processing by machine vision systems. Preprocessing generally proceeds in steps from the "bottom-up," although "top-down" preprocessing has been suggested as a model for human vision. Preprocessing is accomplished by preprocessors, which may be implemented in hardware or software. In some systems, preprocessors have served as the first layer of a two layered neural network. Preprocessing strategies have included subdividing a whole image to be processed into sub-images. Various filters have been suggested to operate on the data, converting the data to a different form or value distribution. Control masks have been used to focus a network on a specific domain of an image.

Prior approaches to the problem of modeling biological preprocessing have been addressed by Grossberg (1988) and Fukushima (1988). For example, the neocognitron neural network developed by Fukushima conceptually models simple, complex, first order and second order hypercomplex cells as well as layers of cells that are sensitive to higher order features. Second order hypercomplex cells are constructed from combinations of first order hypercomplex cells; complex cells are constructed from combinations of simple cells, and the like.

One means of making a complex cell insensitive to location, the approach used by Fukushima, is to design it to receive input from several adjacent simple cells, whose frequency and orientation tuning are similar. The complex cell is made sensitive enough to respond when only one of the simple cells responds to a stimulus. The result is a complex cell with the same frequency and orientation tuning as the simple cells, whose receptive field size is equivalent to the total receptive field size of all its input simple cells combined. Furthermore, the complex cell is insensitive to where in its receptive field the luminance pattern is located (i.e., the complex cell is insensitive to which simple cell has been activated.) Trying to apply biological principles to artificial vision systems, Porat and Zeevi (1989) determined from their work and the work of others, that "primitives of image representations in vision have a wavelet form similar to Gabor elementary functions (EF's)," and proposed a method for texture discrimination in images using a Gabor approach.

Although Porat and Zeevi (1989) proposed that "These localized operators (referring to Gabor functions) are also suitable for a pyramidal scheme of multiresolution which appears to be characteristic of vision, and can also serve as oriented-edge operators and in pattern recognition tasks," (p. 116), they adopted the prevailing approach to the process as a bottom-up hierarchy.

An alternative to extracting features using predefined, generally applicable fixed filters (detectors), such as generated by Gabor and end-stop filters, is to design a system that generates its own feature detectors. In biological systems, the feature detectors must be general enough to handle all possible inputs encountered during the life experiences of the animal. It has been shown that a linear neural network with a correlation rule, when stimulated by random noise, will develop feature detectors similar to the center-surround and Gabor filters found in some artificial visual systems. However, in most practical applications of artificial networks, the universe of possible inputs is more restricted. This suggests that a system for adaptive filter generation that can develop feature detectors specific to the range of images that are encountered in a practical application would be highly desirable. Self-modifying learning algorithms have been pursued wherein a learning algorithm learns about its own effectiveness and modifies itself so that it is the most effective algorithm for solving a certain class of problems.

Despite extensive efforts and much progress, "Forty years of research in artificial neural networks has yielded networks with the neural complexity of, perhaps, a sea slug." (Wenskay, 1991) Image recognition and classification remains a major frontier. The present invention advances toward this frontier.

SUMMARY

The present invention is a more flexible machine vision system than is presently available. The invention concerns an architecture for a machine vision system, and a method for using the system. The invention may be implemented in a computer system with hardware and/or software elements. A vision system takes visual data as input signals, builds an internal model of the image, and then recognizes or classifies the image as some previously known object.

The elements of the image recognition system of the present invention perform three operations: 1) preprocessing, in which micro- and macro-features of information input to the system are located and extracted; 2) associative learning, which takes the extracted features and identifies groups of features at various levels of aggregation; and 3) feedback, which uses previously learned identifications to facilitate future processing, is used to correct binding of features and to specify features on which the attentional mechanism focuses. Thus, feedback integrates information among subsystems.

In accordance with the invention, the preprocessor module extracts features from images by employing a "top-down" method. The preprocessor extracts large-scale features first, before examining smaller ones; hence the "top-down" appellation. That is, the preprocessor applies biologically realistic functions known to those of skill in the art, such as Gabor (Gabor 1946) and end-stopped filters, to the image as a whole, regardless of its size. The preprocessor extracts features, generally both line and texture information, in a pixel-independent fashion. The preprocessor immediately extracts the large-scale features. If the image is a simple one, for example, an image that consists of a few lines, the preprocessor stops with these relevant features. Otherwise, if the image is more complex, e.g., consisting of many interconnected lines, the image is divided into sub-images, and the feature extraction process is repeated until preprocessing is determined to be complete by a criteria defined for a particular application.

More specifically, the preprocessor employs a method having three major steps. First, the image is divided into a small, predetermined number of equally sized sub-images. Second, several processing operators are applied to each sub-image. A term used interchangeably herein with "sub-image" is a "sub-area." These processing operators compute the centroid of each sub-image, and translate each sub-image so that the centroid is centered in a receptive field. After that, biologically modelled functions such as Gabor and end-stopped filters are applied to extract information. Gabor elementary functions (EF's) are means for representing signals. Adaptive filters are also generated to represent edge, texture, line end and curvature. Third, the preprocessor determines whether a smaller scale is necessary, by determining whether, for example, Gabor output decreases as sub-image size decreases. If the Gabor function size doesn't match the subimage, e.g., in a bar code image if the bar code is too wide, the Gabor function won't respond in which case each sub-image is divided and the three step process described above is repeated. The level of detail extracted need not be the same for all sub-areas of the image. Some sub-areas may be processed only once, while others may be sub-divided many times to obtain the desired level of detail.

A top-down hierarchy leads to independence from input pixel coordinates and from excess resolution, thereby creating an image analysis, synthesis, and classification scheme that is efficient as well as tolerant of translation, distortion, and noise. This approach leads naturally, and with minimal additional computation burden, to the generation of illusory contours, primal sketches, and the potential for the recognition (classification) of instantiation of classes (reading a particular person's handwriting or recognizing a particular person's face) while retaining the ability to perform the generalized task (e.g., read handwriting, recognize certain types of faces). This may be accomplished by associatively learning the differences between the instantiations and the primal sketches.

The top-down hierarchy used by the preprocessor employs a method for extracting images that provides a biologically realistic processing method for extracting features. Automated vision systems overwhelmingly approach an image using a "bottom-up" approach. As mentioned in the background herein, a "bottom-up" approach is one that represents the image as a collection of pixels, and then tries to recognize features within the image by ascertaining the relationship between the pixels. In contrast, the current invention begins with the image as a whole, and only segments the image if it is necessary to extract smaller scale features. According to reports on the biology of neural systems, the top-down approach is likely to more accurately simulate human vision. The overall architecture models the interaction and feedback between lower and higher level visual processes easily, without extraneous computation.

In summary, the basic steps of top-down preprocessing of an image include the following:

(1) Dividing the complete image into sub-images each contained in a receptive field;
(2) Computing the centroid of the image in each receptive field;
(3) Translating each sub-image region so that its centroid is centered in its receptive field;
(4) Applying biologically modelled filters such as Gabor and end-stopped filters;

(5) Determining whether a smaller scale is required; and
(6) Repeating steps 1–5 until a smaller scale is not required. This six step process yields the location of micro-features (i.e., local coordinates of each feature relative to the center of the receptive field in which it is located and the centering translations that were applied) and the content of micro-features (the output of each of the filters at a particular scale). This information is utilized as input to the next processing stage.

The information extracted during preprocessing is used as input to an associative learning neural network which performs pattern recognition and classification tasks. An illustrative embodiment of a suitable neural network is DYSTAL, a system described by Alkon et al. (1993).

The preprocessor may also stand alone and be used to generate a primal sketch. A primal sketch is a term used to describe an information structure that contains descriptions of intensity changes within the image (lines, edges, and the like) and yet maintains a two-dimensional geometry. The primal sketch may, in turn, be used as input to many different pattern-recognition systems.

The present invention provides a mechanism for greatly increasing the speed at which a vision system identifies images. The invention uses feedback both within the associative learning neural network and between the preprocessor and the neural network to correct feature binding, to further increase recognition speed, and to provide attention. Feature binding is the process by which specific features or attributes are linked to a single object. The system associatively learns the optimal size for receptive fields, and the correspondence between primal sketches and classes of images.

The present invention receives a variety of different types of visual data as input. Some examples include scanner outputs of photographs, character sets, or signals from Magnetic Resonance Images. The invention is adaptable for use on many different hardware and software platforms.

The concept of top-down preprocessing facilitates computational simplification, designed to allow construction of a robust pattern recognition system of practical utility on a serial computer.

The following definitions are used herein;

A contour is an outline of an object or a part of an object.

A feature is a characteristic of some component of an image.

Feature binding is the process by which specific features or attributes are linked to other features or attributes, for example, a nose, eyes, and a mouth are linked to form a face; a head and a body are linked to form a person. Feature binding is defined in the context of attention.

A feature operator is a method of determining whether a feature is present in a particular location of an image.

Feature selection and extraction is a process in which a set of feature operators are applied to an entire image, and data about the presence or absence of features is obtained.

A filter is a function that transforms raw data into a value indicating the degree to which a feature is present in the image; it is a process that changes or separates data; turns data into information. The output of a filter is a value indicating the degree to which a feature is present in the image.

A global parameter is a numeric value that applies irrespective of the content of an image.

A global threshold is a value used as a criteria or cut-off point that is applicable for the entire system.

An illusory contour is an extension of lines present in an image that is an extrapolation of the real image generated by the visual system.

A luminance pattern is a pattern made by variations in luminance (i.e., a pattern of intensity variations).

A macro-feature is a large scale or global feature; it is a collection of related (bound) micro-features described in a coordinate system whose origin is the center of the macro-feature so defined.

A micro-feature is the smallest piece of information about an object that helps to characterize it; it is the lowest level of output of a field at a particular scale.

Neural networks are artificial systems modelled after biological learning systems.

A pixel is the smallest subdivision or element (picture element) of a digitized image.

Primal sketch is a term used to describe an information structure that contains descriptions of intensity changes within the image (lines, edges, and the like) and yet maintains a two-dimensional geometry.

A receptive field is the area to which one or more filters or functions are applied; it is modelled after a receptive field in biological vision.

Texture refers to the apparent property of a physical surface other than mean luminance.

A texture pattern is a pattern made by variations in some property other than mean luminance or intensity. e.g., a pattern made by variation in fractal dimension in which the mean luminance does not change.

Figure 1:
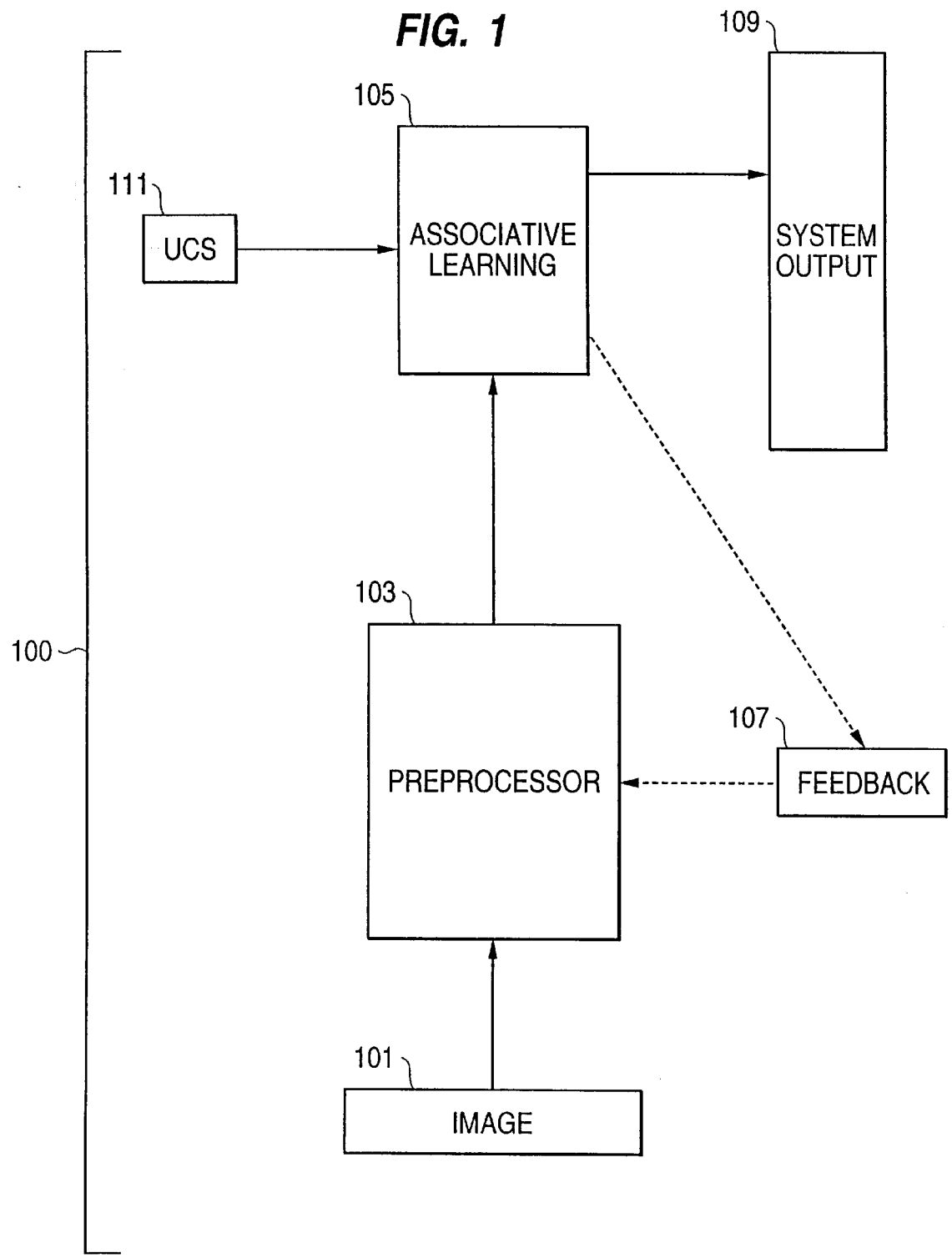
FIG. 1 is a flow chart illustrating the overall architecture of a machine vision system.

Note that for all figures, a rectangular element designates a processing step, and an oval element designates the output of a processing step.

DESCRIPTION OF THE PREFERRED EMBODIMENT

The present invention relates to a machine vision system and its applications, particularly in the context of classification and pattern recognition of images. An image 101 is input into the system. The vision system has three main modules or subsystems (also termed "elements") (FIG. 1): a preprocessor 103 wherein macrofeatures are formed from microfeatures using a top-down preprocessor and multi-layer DYSTAL; an associative learning network 105; and feedback 107. Unconditioned stimuli 111 are input to the associative learning network, scaled macrofeatures are input, generally as conditioned stimuli. There is feedback 107 between the associative learning and preprocessing subsystems to improve performance, for example, by correcting feature binding. Finally, the output of the system 109 is an analysis of the input image, e.g., by assigning it to a class by means of object labels and coordinates. The modules are linked by signal pathways.

The first subsystem has preprocessors employing, for example, a texture filter, a Gabor function, all working in parallel. The second subsystem has an associative learning neural network; and feedback from the associative learning neural network to the preprocessor. In the present system, information is exchanged among modules. As shown in FIG. 1, an image 101 is presented to a preprocessing subsystem 103. Macro-features are formed from micro-features by means of top-down preprocessing. The macro-features are scaled (normalized) and passed to an associative learning system 105, generally a neural network, as conditioned stimuli (CS). Unconditioned stimuli 111 are also input into the associative learning subsystem.

In the preprocessing module (subsystem) micro-and macro-features are located and extracted. In the associative learning module, groups of features are identified at various levels of aggregation. During feedback, previously learned identifications (UCSs) are used to facilitate future processing.

The invention is not limited to specific input elements or applications, and can be adopted for use on many different hardware and software platforms. Utility resides in improved image analysis for a myriad of applications including medical image analysis for diagnosis.

The preprocessor uses a "top-down" mechanism to extract features from the image. No segmentation per se is necessary, because the preprocessor extracts features from the image as a whole, and subdivides the image only when necessary in order to obtain more detail. This process is in contrast to traditional systems, which work from the bottom up and need to combine noisy, localized information into image segments or components as a first step in feature extraction. In bottom up systems, the feature extraction and feature binding mechanisms determine how segments in the image relate to one another. Many conventional image analysis approaches disclosed in the art employ a "bottom-up" approach which focuses initially on received pixels.

The present invention is distinguished from systems previously developed because it identifies large scale features initially and descends hierarchically to smaller features only if necessary. Although the concept of "top-down" analysis is known, the pixel-free representation employed by the present invention is neither taught nor suggested. It would not be obvious in the field of image analysis to employ a pixel-free approach in extracting features because pixels are a routine part of image analysis. Furthermore, the functions used for the processing, such as congruently scaled Gabor and end-stopped filters that fit varying receptive field sizes, would not have been obvious because they are usually defined on a pixelated image of globally defined size. Pixels are the standard method of data presentation for image analysis. In the present invention, features are independent of the number of pixels in a subdivision of an image.

Preprocessing

A first step of preprocessing (FIG. 2) is to apply a fixed filter (top-down preprocessing 201) and an adaptive filter (multi-layer DYSTAL 203) preprocessors to extract micro-features and their locations. In addition, local image texture is characterized using fractal dimension measures (Harrington, 1988). Although Gabor filters extract texture information (Malik and Perona, 1990; Porat and Zeevi, 1989), fractal dimension provides a scale invariant measure of texture, and this property is useful in feature binding because areas with the same fractal dimension are most likely to belong to the same object and should be bound.

The second step, feature binding 205, is to group these micro-features into macro-features, e.g. objects with simple shapes, object components (e.g., legs—of chairs, tables, cats, giraffes, and the like), facial features (eye brows, lips, ears, and the like), using a feature binding algorithm. A number of feature binding schemes are suitable, including, but not restricted to:

(1) Top-Down Preprocessing, whereby responses from co-linear Gabor filters in adjacent receptive fields are grouped into object contours. Because it is possible to interpolate between Gabor filters at a given scale and location but at different angles, it is possible to establish the angle of an edge fairly accurately even in the absence of a Gabor function in that specific angular direction. It is therefore possible to check for Gabor filter outputs at a given angle and with a common receptive field edge location in adjacent receptive fields, thereby identifying and constructing macro-features that span more than one receptive field.

(2) Another method of feature binding is the network of Sajda and Finkel (1992). Their network groups Gabor filter outputs that respond to the same object contour. The robustness of the algorithm has been demonstrated on gray shade images and the Kanizsa square (an illusory contour).

(3) Commonality of texture within subareas (not necessarily co-terminal with receptive field edges) is an additional area feature that has the potential to provide the basis for binding features. Available texture measures include Gabor filter output (e.g. Landy and Bergen, 1991; Xing and Gerstein, 1993), and a fractal dimension measure of local texture (e.g., Harrington, 1989).

Figure 2:
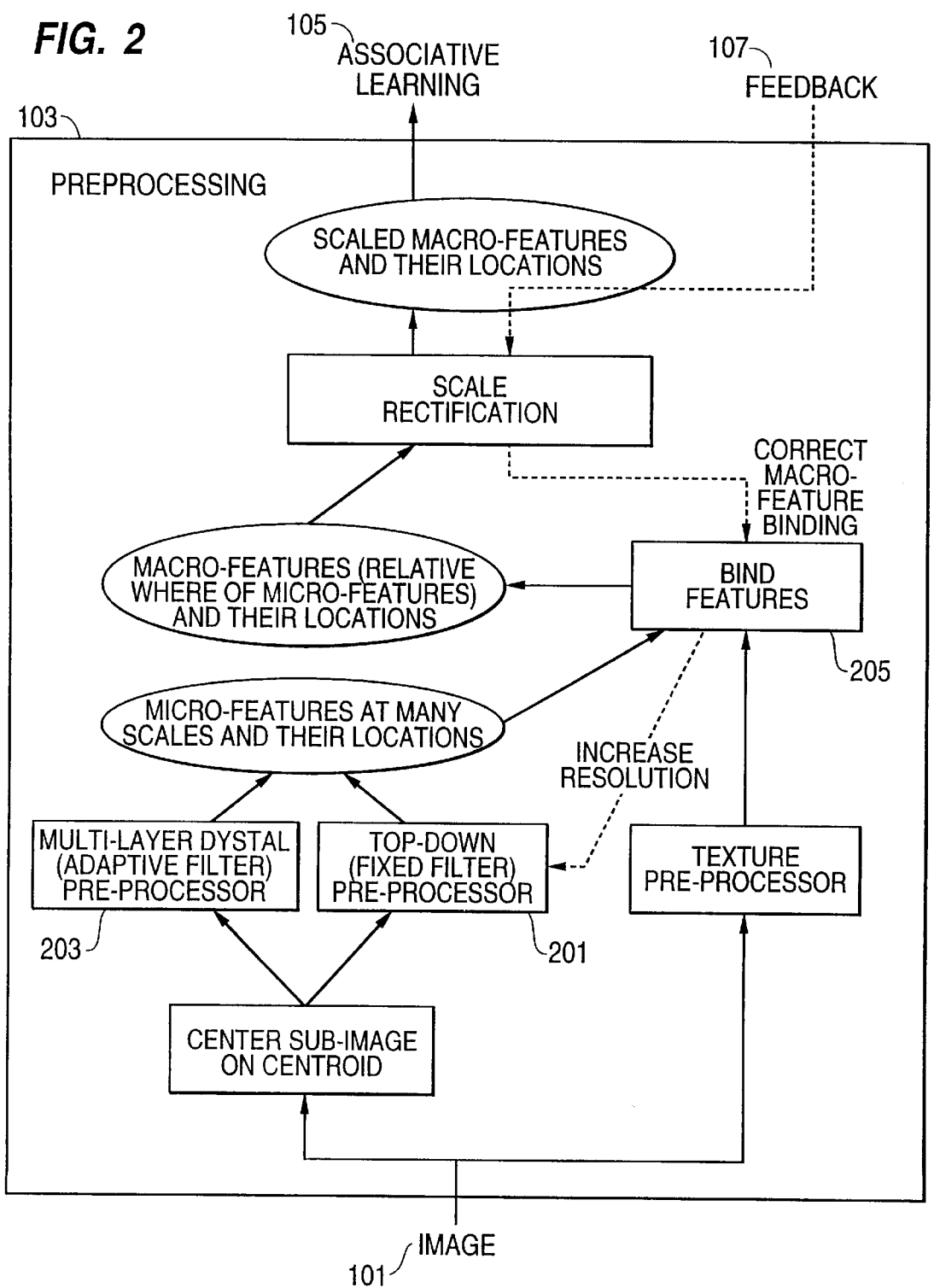
FIG. 2 illustrates a preprocessing module (subsystem) of a machine vision system.

As illustrated in FIG. 2, the first step of preprocessing is to apply the fixed filter (top-down preprocessing texture operators) and the adaptive filter (multi-layer DYSTAL) preprocessors to extract micro-features and their locations. If a human operator doesn't like the result, or a different application is required, the filters can be changed. Filters are selected for each project or computer run based on expected image properties. The second step, feature binding, is to group these micro-features into macro-features.

The third step is to calculate centroid coordinates of macro-features and relative coordinates of micro-features. After the macro-features are defined, the locations of their centroids are computed as the weighted value of micro-feature centroids, in which the weight is proportional to the mass of the micro-feature. Macro-features are, in fact, sets of bound micro-features—including both their coordinates and the filter outputs. Also in this step, the coordinates of the centroid of a macro-feature becomes the center of local coordinates of bound micro-features and are used to compute the location of micro-features relative to the centroid of the macro-feature of which the micro-features are a part.

The fourth and last step of the preprocessing is Scale Rectification, whose purpose is to simplify the classification (associative learning) stage. In this step, the micro-features (filter outputs) that are bound to macro-features are rearranged into a fixed size array for input to the associative learning stage. The distances among micro-features of each macro-feature, and the distances among macro-features are normalized with respect to some fixed, predefined, array size. The relative locations of all micro-features are maintained during this process, and the magnitude of scale change used during normalization is retained for later use. As a consequence of this scale normalization in feature space, the feature will be the same apparent size when presented as conditioned stimuli to the associative network, independent of the number of pixels occupied by the feature in the original image.

The output of the preprocessing stage is a set of macro-features, each macro-feature consisting of a bound set of micro-feature values (filter outputs) arranged in an array that maintains relative locations of micro-features. Binding may be modified by feedback, and that feedback is used as the basis for a candidate stopping rule for scale decrementation in top-down preprocessing. Feedback may also be used to let UCS inputs drive feature selection for previously learned associations.

A. Top Down Preprocessing

Figure 3:
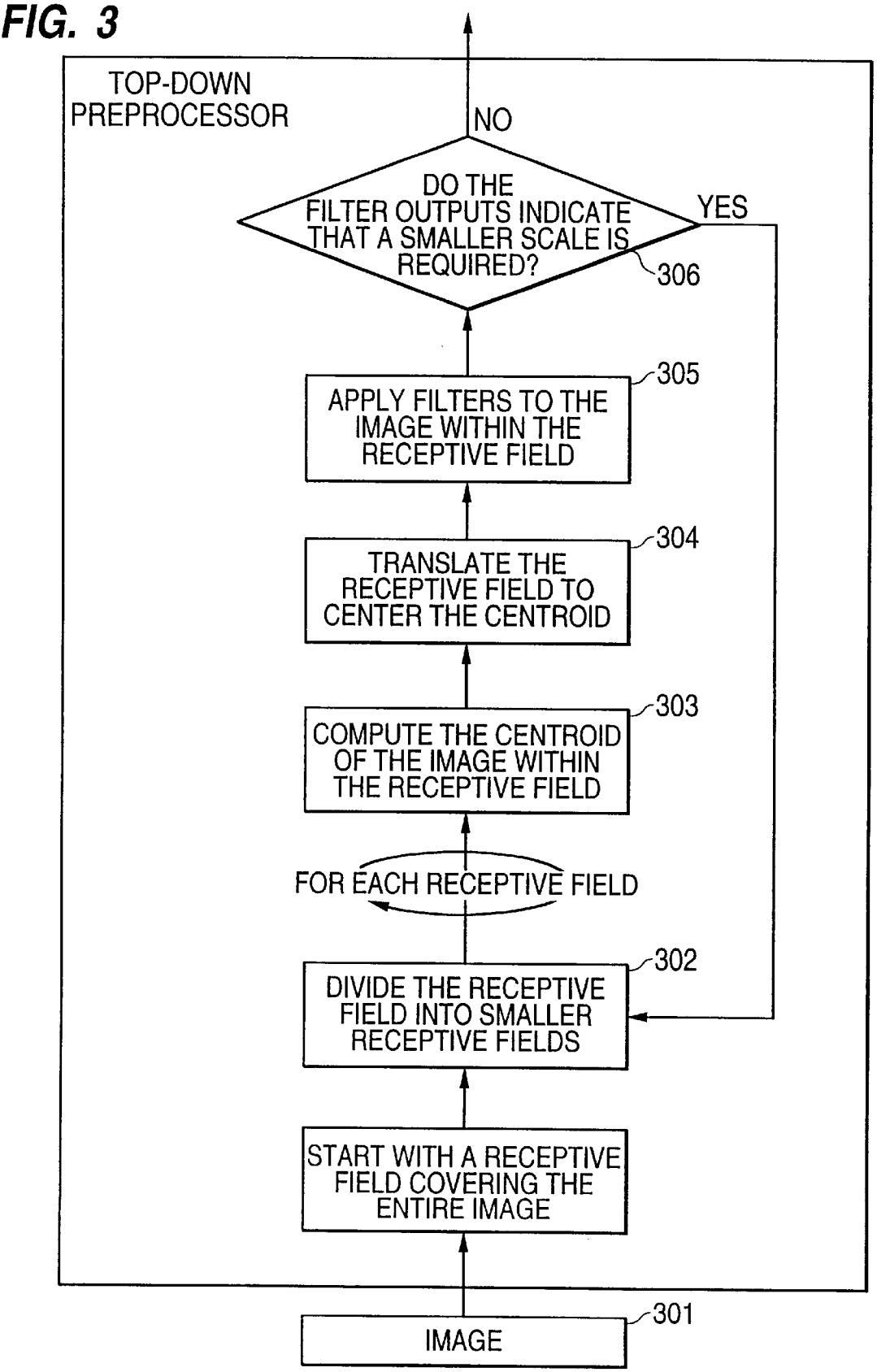
FIG. 3 is a flow chart of top-down preprocessing.

Top-down preprocessing (FIG. 3) uses fixed filters in a novel approach to understanding an image. A top-down preprocessor identifies and locates large scale features before examining finer details. In the present invention any necessary segmentation and all feature extraction steps are integrated into a single preprocessing step (FIG. 2 and FIG. 3). This is in contrast to a "bottom-up" approach which first segments the image in the preprocessor, and then extracts features in a second module. This top-down approach offers the following advantages: (1) it employs a spatially varying and dynamically adjusted receptive field and therefore potential feature size, thereby minimizing the overall scanning or searching required for image understanding; (2) it generates illusory contours without significantly increasing the computational burden; (3) it integrates line and texture information into pixel independent features in an unforced manner; (4) it minimizes the number of global parameters and thresholds; (5) it integrates information from several different feature operators, thereby placing less reliance on the accuracy of a single feature operator; and (6) it is robust against moderate translation and scaling.

To apply top-down preprocessing, a whole image 301 is divided into a small number 302, e.g. four (non-overlapping) or five (overlapping), rectangular (or other shape) subareas preferably of equal size. The number of the subareas used and their geometry are altered depending on the particular application. The number of subareas selected is determined a priori, independent of the size of an individual image. This is a global parameter. To each of these subareas, several processing operators are applied. These are scaled to fill the subarea, and extract information about edges, texture, and other features, independent of subarea size. If necessary, each subarea is subdivided, and the processing operators are reapplied at a smaller scale. This is a computational simplification of biological systems, in which all filters are applied at all scales in parallel.

An illustrative embodiment which requires much less computer storage than some other embodiment does not explicitly model all layers, analogous to "cells," but instead incorporates the location insensitive property of complex cells into the Gabor function model of simple cells and the location insensitive properties of second order hypercomplex cells into first order hypercomplex cells. To do this, the centroid of the image within the receptive field is computed 303. Then, a translation 304 (whose components are stored in memory) is applied that places the centroid at the center of the receptive field. Thus, no matter where within the receptive field the luminance pattern occurs, after the translation the luminance pattern is centered within the receptive field. Subsequent to centering, a Gabor filter and an end-stopped filter are applied 305, both of these filters are also centered within the receptive field. Because of the centering operation, the initial location of the luminance pattern within the receptive field is not relevant to the output of the filter and the response of the Gabor filter is insensitive to the initial location of the luminance pattern within its receptive field. This is a more efficient use of computer storage than the method actually used by the biological visual system because cells in the visual system do not necessarily compute centroids and instead use additional cells, located at every possible location.

Subsequent to the centering process, the filters are applied and the output of the filters are normalized to produce a scale independent output. Thus, when the luminance profile of an image region within a filter's receptive field matches the filter shape, the output of the filter is maximal. In other words, a micro-feature has been detected when the filter output is large.

A criterion, test, or procedure is used to determine whether a smaller scale is required. One approach is based on using the feedback signal described in a subsequent section herein. In this approach, recognition (classification) performance information is fed back to the preprocessor. If performance is inadequate, a smaller scale is required 306.

It is useful to determine whether the response(s) near the lowest spatial frequency peak (i.e., among the receptive fields tried so far) is (are) sufficient to associatively learn to distinguish the generic nature of the features, e.g., is it sufficient to distinguish an interior scene from an outdoor scene from a portrait? In another embodiment, output from several scales of filters are input to Dystal to reliably learn the differences among scenes and objects.

In the top-down preprocessing with centroid centering, retinotopic coordinates are abandoned in favor of feature-space centered coordinates, where micro-feature locations are described relative to each other in a coordinate system centered on the receptive field. Similarly, macro-features are also described in a coordinate system that defines the spatial locations of their centroids relative to each other. This, together with "scale rectification" as described herein greatly ameliorates problems associated with scale, resolution of the input image, and translation differences in both the input as a whole and individual objects in the input scene.

B. Multi-layer DYSTAL Preprocessing

A suitable and efficient neural network for generating adaptive filters is multi-layer DYSTAL. (FIG. 4) DYSTAL produces an input-pattern-specific set of micro-feature filters (designated "patches"), usually in Cartesian space, that is complementary to the fixed spatial frequency filters of top-down preprocessing. Multi-layer DYSTAL also aggregates micro-features into macro-features, which it can then associatively classify. A multi-layer DYSTAL network is used as an adaptive feature detection system applied in parallel with the top-down system described in the previous section. DYSTAL's patch vectors indeed are micro-feature filters (extractors) which are produced as a specific response to the set of input training patterns, e.g., luminance patterns.

As explained in the section on preprocessing, first, the centroid of the image region within the receptive field is computed. Then, a translation (whose components are stored) is applied that places the centroid at the center of the receptive field. Thus, no matter where within the receptive field the luminance pattern occurs, after the translation, the luminance pattern is centered within the receptive field. With reference to the associative learning module, the centered luminance pattern is the conditioned stimulus (CS) input to DYSTAL (see Alkon et al., 1993 for a description of the system algorithm and an explanation of patches). As a consequence of the centering operation, fewer patches are created, because it is not necessary for DYSTAL to create a separate patch for each location of each luminance pattern.

In contrast to a DYSTAL network operating as a classifier (Alkon, et al. 1993), in which the output of each processing element is a stored unconditioned stimulus (UCS) value associated with the patch vector, when DYSTAL is used as a feature detector, the output of each DYSTAL processing element is a subset of the patch labels with their associated similarity values. This process is achieved by using the CS input from the original image as in single layer DYSTAL, but without providing a UCS input. This is conceptually equivalent to providing the same UCS signal for all inputs. The consequence of this maneuver is that the patches that are formed (in the usual case on a relatively small receptive field) represent features on the scale of the receptive field size that may be common to multiple training inputs, irrespective of the class of the training exemplar.

Multiple layers of DYSTAL processing elements may be concatenated, in which case the micro-features (as defined by patch labels) are aggregated into ensembles of patch labels. Just as simple cells may be described as combining outputs of retinal ganglion (center-surround) cells, so a second DYSTAL layer learns combinations of first layer outputs which occur repeatedly. Second and higher layers of DYSTAL take patch vector labels as input. The patches created by these layers, consisting of ensembles (vectors) of patch labels, are called meta-patches.

A fundamental issue in the design of multi-layer Dystal networks is the choice of a similarity measure for the non-input layers. Each patch of an upper layer (called a metapatch) stores one or more patch labels (patch identifiers) and, if required, the similarity corresponding to each of those such patch labels stored is a global parameter. The patch labels that are stored are those that are most similar to the input pattern. The similarity values that are stored with the patch label are the similarities of that patch to the input pattern.

Propagating only the patch labels, or only one patch label and its corresponding similarity (a winner-take-all mechanism), is not preferred. Therefore, many of the similarity measures discussed below use the similarity values propagated by the lower layer patches whose labels are stored in the meta-patch. When a pattern of activations is presented to a neuron of non-output layer of a Dystal network, the similarity is calculated between the pattern and each of the neuron's patches. These similarity values are then propagated to the next layer of the Dystal network. Relative to the next layer, the previous layer is considered an input layer. Reference to similarity values corresponding to the meta-patch, means the similarity values which are propagated from a patch of an input neuron whose patch label is stored in the meta-patch.

A few simple similarity measures have been used, including the following: a Hamming distance between the patch labels stored in the meta-patch and the patch labels corresponding to the input layer patches with the highest similarity values; the L-norm of the propagated similarity values corresponding to the meta-patch; the dot-product, normalized dot-product, or Pearson's R correlation measure between the stored similarity values and the propagated similarity values corresponding to the meta-patch. An L-norm is a generalization of an average, $$similarity = \sqrt[L]{\frac{1}{n} \sum_{i=1}^{n} Sp_i^L}$$

where $Sp_i$ is the propagated similarity value corresponding to the meta-patch, and n is the number of patch labels stored in the meta-patch. Note that if L=1, this is a simple average. None of these similarity measures seem as suitable for the present invention as the two discussed below.

Two similarity measures that have some advantages for use in the present invention are (1) a weighted L-norm of the propagated similarity values corresponding to the metapatch and (2) a function of the difference between the stored similarity values and the propagated similarity values corresponding to the meta-patch. To compute the first measure, a weighted L-norm, the propagated similarity values ($Sp_i$) are weighted by the similarities stored in the meta-patch ($Ss_i$), $$similarity = \sqrt[L]{\frac{1}{\Sigma Ss_i} \sum_{i=1}^{n} Ss_i Sp_i^L}$$

where n is the number of patch labels in the meta-patch. If L=1, this is the weighted average. The second measure, the difference between the stored and propagated similarity values, is computed with the following equation:

$$similarity = \frac{2}{n} \sum_{i=1}^{n} [1 - (Ss_i - Sp_i)^m] - 1$$

where m is a global parameter. If m=2, this similarity is essentially equivalent to the Euclidean distance between the patterns of similarity values.

As examples of use of similarity measures, in one handwritten digit recognition task, single layer Dystal achieved a 3% error rate (incorrect classifications) with 5.2% rejects (unclassified, i.e., not classified as being a particular digit, or classified as being two or more digits). Thus far, multi-layer Dystal using the weighted average similarity measure has achieved a 2% error rate with 7% rejects and using the squared difference measure has achieved a 2.2% error rate with 6.9% rejects.

The weighted squared difference, uses features of both of the similarity measures discussed in previous paragraphs:

$$similarity = \frac{2}{\Sigma Ss_i} \sum_{i=1}^{n} Ss_i [1 - (Ss_i - Sp_i)^m] - 1$$

The final step in preprocessing, aggregating the micro-features into macro-features, requires the integration of information from the independent preprocessors, which may consist of several sources, e.g.: (1) the microfeatures and their locations as derived by top down preprocessing; (2) the output of adaptive filters generated by multi-layer DYSTAL, and (3) local area texture measures, such as described, for example, in Malik & Perona, 1990; Porat & Zeevi, 1989; and Harrington, 1989.

System Integration

The two preprocessing sub-systems outlined herein fit into an overall feature recognition/scene classification system. For this role, preprocessing is integrated with associative learning paradigms.

FIG. 1 elucidates, in flow chart form, the overall pattern recognition\image interpretation system. The system is divided into three subsystems: Preprocessing (FIG. 2 and FIG. 3), in which micro- and macro-features are located and extracted; Associative Learning (FIG. 4), which identifies groups of features at various levels of aggregation; and Feedback (FIGS. 2 and 4), which uses previously learned identifications to facilitate future processing.

Associative Learning

Figure 5:
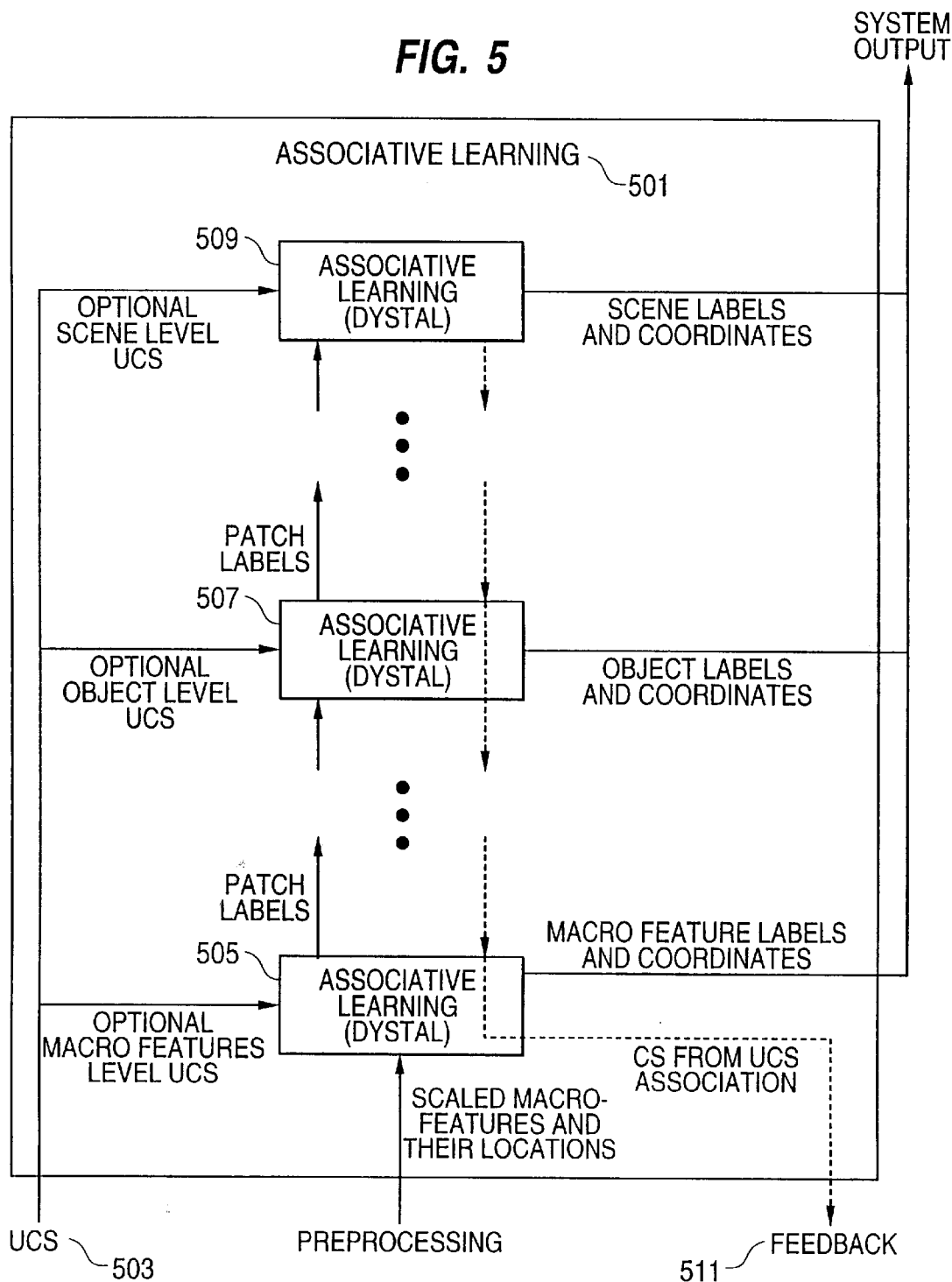
FIG. 5 illustrates an associative learning subsystem of the system.

As illustrated in FIG. 5, the associative learning system 501 learns associations between macro-feature descriptors and their categories. This stage consists of several DYSTAL networks in series (e.g. three), thus forming a multi-layer DYSTAL, each layer of which may receive a UCS 503. In an illustrative embodiment the first network 505 learns to identify macro-features from their component micro-features, and thus, during training, receives a UCS that corresponds to the identity of the macro-feature. The second network 507 aggregates macro-features into objects; during training, it receives a UCS corresponding to the object identity. The third network 509 aggregates objects into a scene; during training, its UCS corresponds to a scene level identification. During training, appropriate UCSs may be presented to one, two or all three of the DYSTAL networks. It is the patch labels and not the UCS output that forms the input for each successive DYSTAL layer; therefore, it is not necessary to include a UCS for each layer.

Figure 4:
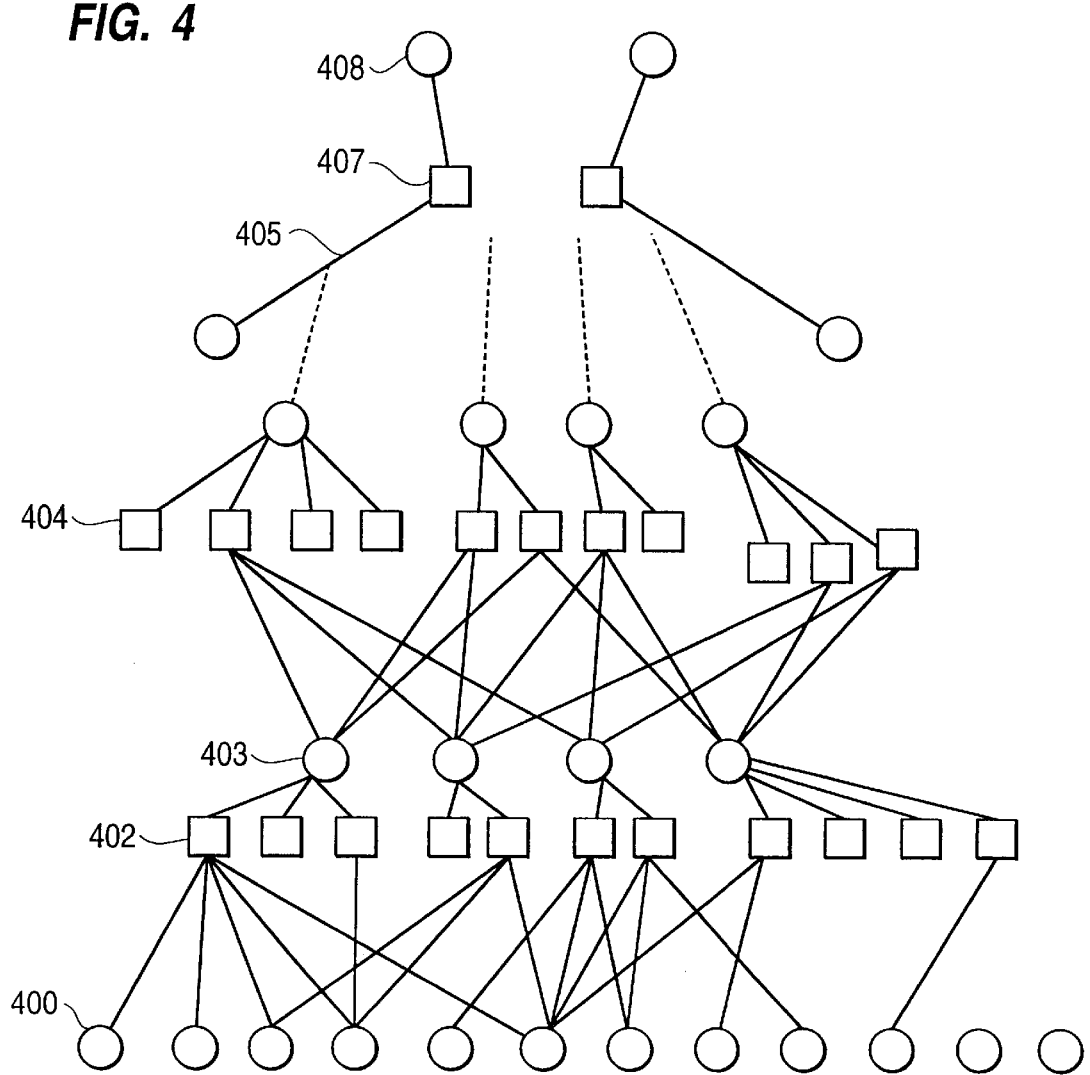
FIG. 4 is a diagrammatic representation of multi-layered DYSTAL.

In a preferred embodiment, FIG. 4 shows a multi-layered subnetwork. The first layer of Dystal units is constructed such that UCS inputs are eliminated or, equivalently, all UCS inputs are set to the same value irrespective of the class of training exemplars. Patches are storage and processing areas interposed between the input and output elements of the system. When patches are formed, the patches reflect only the similarity of CS patterns, independent of their classification. If the receptive fields are chosen in such a way that each receptive field is but a portion of the complete input pattern, then the patches will record, and respond to, similarities in the portion of the input field to which they are attached, that is similarity of "features" within that portion of the field. Consequently, the output neurons of the first layer 403 transmit not the product of the most similar UCS with the similarity measure, but rather a pair of numbers: the identification of some subset of patches (depending on their associated similarity measure), and, optionally, the similarity measure, as input to the second layer 404.

The second layer of the network has, in this embodiment, an input field large enough to equal the total number of output elements on all the neurons in the layer below, and a number of output elements equal to the number of components in the input UCS. The input to the second layer will consist of the identification of each sufficiently well matched patch of the preceding layer and, optionally, value of the similarity measure for each patch, presented on the input line corresponding to that patch; the classifying UCS is presented to the UCS input of the second layer.

The advantages of this two layer network:

1. The first layer generates fewer patches because similar CS inputs do not form different patches. Similar features are sought across classes. This is a particularly significant advantage when the application to which the method is directed contains a large number of classes (such as the identification of 4000 different hand-written Japanese Kanji characters).
2. The second layer, which performs the actual classification function, classifies not on the basis of the entire image or components thereof, but rather on the basis of features clustered by the patches generated in the first layer. Thus, common features among classes can be identified by examination of the first layer patches, and features specific to each class can be determined by examining the patches of the second layer.

The size of the receptive field on the second layer may be too large for efficient operation if it is constructed according to the principles outline above. If problems occur, the following remedies may be applied:

1. If temporally mixed training and testing are not required (i.e., in a temporally stationary environment), the first layer can be trained first without training the second layer. Thus, when training of the first layer is complete, the distribution of patches among the first layer output neurons and their numbering is known, as is the similarity measure with respect to the training set. A decision can then be made to limit the connections to the second layer to some subset of the first layer patches with the highest similarity measures across the training set.
2. A preferred, modification consists of using a "pruning" option. In this implementation, connections from the first layer to the second are pruned on the basis of their variance with respect to the UCS-specific signal. Thus, an appropriate number of unnecessary connections between the layers is removed.
3. Alternatively, "budding" may be employed to start the development of second layer patches with only those connections reflecting the least variance with respect to the UCS, and adding additional, higher variance connections, as needed to improve classification performance.

Another view of FIG. 4 is that it illustrates the extension of a two-layer system to a multi-layer system wherein there is an input 400 in the first layer from conditioned stimuli, and that input is transmitted to a series of patches 402 which connect to output neurons 403. A difference between the multilayered system and the simpler system at the entry layer is that there are either no unconditioned stimuli or that they are all set to the same value so that, in effect, the processing is independent of unconditioned stimuli.

The output of the first layer is used as the input layer of the successive layer. The output 403 of the first layer is the input of the second layer. This input may be transmitted to patch elements 404 of the second layer. However, the patches may be linked to a plurality of output neurons from the first layer 403. Viewing the system from the output neurons of the second layer, there may be signals from a plurality of output neurons in layer 1 to patches connecting to an individual neuron output of layer 2.

This pattern of interconnecting layers may extend for n layers, where n is determined by the particular circumstances of the problem being addressed. Not only can n layers be placed in series, but m of such series networks (each with a different n, if desired) can be placed in parallel, finally converging on the nth (final) output layer, with its associated USC 405.

At the nth layer, input from unconditioned stimuli 405 is also provided, i.e., one component of unconditioned stimuli is provided to each patch. The final output of the nth output neurons is shown as 408 in FIG. 4, the final patches as 407. Multi-layer systems may be connected in series and/or parallel.

The present invention advantageously provides a dynamically stable associative learning neural network system that associatively learns both correlations and anti-correlations, that can be configured to classify or restore patterns simply by changing the number of output units, in which the computational effort scales linearly in complexity with the number of connections, and in which neither global nor local feedback connection are required during learning.

A multi-layer DYSTAL engaged for the associative module of the present invention differs in function but not in structure from the multi-layer DYSTAL used for adaptive feature extraction. A belief that the architecture of DYSTAL is biologically valid is encouraged by virtue of the applicability of the DYSTAL architecture to different but related functionalities: feature extraction, associative learning, and associative recall.

For example, when processing an image of a dog standing on a bench, the UCS may be "tail" at the macro-feature level; "dog" at the object level; and "dog show" at the scene level. It is the patch labels and not the UCS output that forms the input for the next DYSTAL layer; therefore, it is not necessary to include a UCS for each layer. This implies that, for example, the second layer is not constrained to learn that a dog consists of a tail, head, four legs, and the like.

During recall, no UCS inputs are presented. The output of each DYSTAL sub-network consists of patch labels, which are DYSTAL's internally generated, self consistent identification, similarity measures, and, if available, the UCS previously associated with the inputs during training. The UCS output is the label identifying the macro-feature, object, or scene. The outputs of the total pattern recognition system to the external world are the set of UCS labels associated with the input scene and the coordinates (in image space) of the centers of the features with which the labels are associated.

A determination of the appropriate scale of macro-features to be learned at the first level may be done by the feedback to the preprocessor. By scale of macro-features is meant the issue of selecting the most appropriate level of aggregation. If, for instance, there is a table in the scene, should the first of the levels be the four individual legs of the table and, separately its top? Or, should it be the table as a whole? It is worth noting in this context, that the difference between a dining room table and a conference table lies not in the table but in its surrounding environment, an association which the invention learns at higher levels of aggregation. Because of potential ambiguities (a wooden bar stool and a small wooden side table differ in many cases only in that the legs of a stool are splayed) an initial choice is to perform the initial macro-feature characterization at the level of the components of a table. In order to accomplish this end, at least in an illustrative embodiment, the system must be informed of the subarea of the training image that contains the macro-feature (or object) for which the system is provided a UCS. A "brute force" method, in which the area in the input scene containing the macro-feature is identified is one approach to employ. This is the task of the biological attentional and/or intentional mechanism.

Feedback

The last subsystem is the feedback subsystem 511, shown in dotted lines in FIGS. 1, 2 and 5. The purpose of the feedback system is two-fold: (1) reduce computational effort, and (2) improve specificity. Both of these purposes are accomplished by learning which micro-features are relevant to the task of identifying a particular set of macro-features, i.e., what set of micro-features is to be bound into a macro-feature to most effectively perform the task(s) at hand.

As described in the preceding sections, the preprocessing system generates a file of the macro-features consisting of their bound micro-feature components, together with their scale and relative coordinates. That is, all the feature data have been generated and stored in their entirety. The feedback system is a method of identifying which micro-features are useful vis-a-vis the learning task, and a method of excluding microfeatures not identified as useful. Thus, the feedback modifies the binding of microfeatures to macro-features. A concept for implementing binding correction requires the feedback path in FIGS. 1, 2 and 5. Under this scheme, binding correction occurs only during training, i.e., when a UCS input accompanies the CS input. There are many patches (CS vectors) with the same UCS. These are alternatives to be tested for.

Generation of the feedback signal is based on another aspect of associative learning. In higher animals, the distinction between CS and UCS becomes operationally blurred. That is, it is just as easy for humans to recall the word "table" when presented with an image of a table as it is to recall the image of a table when presented with the word "table." DYSTAL is also capable of this inversion. Thus, when a UCS is presented, a DYSTAL module can output the CS, i.e., the content of the patch vectors associated with the UCS, into the feedback pathway.

One means of identifying useful micro-features is to compute and store, for example, in a memory of a computer, the variation of each micro-feature (e.g. CS component) with respect to each UCS. Those microfeatures that have a large variation with respect to a particular UCS probably have little information content for identifying that UCS, and those micro-features that have a small variation with respect to that UCS probably have more information content. The micro-features with a large variation may be excluded from the set of features bound to a particular macro-feature. By reducing the number of components associated with a macro-feature, a reduction of the computational load will follow. In addition, exclusion of low-information content micro-features allows an improvement in specificity and generalization ability. Under other circumstances, to increase specificity it may be necessary to increase the number of micro-features bound to a macro-feature. One way this is accomplished is by decreasing the size of the receptive field at which the preprocessors are functioning, thereby increasing the resolution and number of micro-features available for binding. This approach is particularly attractive since it can be applied to both top-down and multi-layer DYSTAL implementations and can also serve as the basis for devising a stopping rule for scale decrease in top-down processing.

CITED DOCUMENTS

The contents of the documents listed below are incorporated herein by reference, respectively, to the extent that they supplement, explain, provide a background for or teach methodology, techniques or compositions described above.

Alkon D. L., et al. Biological plausibility of artificial neural networks: Learning by non-Hebbian Synapses, Chap. 2 in *Associative Neural Memories,* Oxford Union Press (1993).

Daugman, J. G. Uncertainty Relation for Resolution in Space, Spatial Frequency, and Orientation Optimized by Two-dimensional Visual Cortical Filters. *J. Opt. Soc. Am.* A 2:1160–1169 (1985).

Desimone, R. J. *Cognitive Neurosci* 3:1–8 (1991).

Fukushima, K. Neocognition: A hierarchal neural network capable of visual pattern recognition. *Neural Networks* 1:119–130 (1988), Funahashi, S., Bruce, C. J., Goldman-Rakic, P. S. Dorsolateral Prefrontal Lesions and Oculomotor Delayed-Response Performance: Evidence for Mnemonic "Scotomas"—*J. Neurosci.* 13:1479–1497 (1993).

Gabor, D., Theory of Communications. *J. Inst. Elec. Eng.* 93:429–459 (1946).

Gilbert, C. D. Laminar Differences in Receptive Field Properties of Cells in Cat Primary Visual Cortex. *J. Physiol* 268:170–181 (1977).

Grossberg S. Neural Dynamics of 1-D and 2-D brightness perception: A Unified Model of Classical and Recent Phenomena. *Perception & Psychophysics* 43:241–277 (1988).

Harrington L. Computer generation of fractional brownian noise. ERIM Technical Report #c58501-1-T (1989).

Hubel, D. G., Wiesel, T. N. Receptive Fields, Binocular Interaction, and Functional Architecture in the Cat's Visual Cortex. *J. PhysioL (London)* 160:106–154 (1962).

Hubel, D. G., Wiesel, T. N. Receptive Fields and Functional Architecture in Two NonStriate Visual Areas (18 and 19) of the Cat. *J. Neurophysiol* 28:229–289 (1965).

Jones, J. P., Palmer, L. A. An Evaluation of the Two-Dimensional Gabor Filter Model of Simple Receptive Fields in Cat Striate Cortex. *J. Neurophysiol* 58:1233–1258 (1987).

Loomis, J. M., Klatzky, R. L., Lederman, S. J. *Perception* 20:167–177 (1991).

Malik J., Perona P. Preattentive Texture Discrimination With Early Vision Mechanisms. *J. Opt. Soc. Am.* A 7:923–932 (1990).

Pentland, A. P., Ed. From Pixels to Predicate. Ablex Publ. Co., Norwood, N.J. (1986) ISBN 0-685-09831-1 Sajda P., Finkel L. H. (1992) A Neural Network Model of Object Segmentation and Feature Binding in Visual Cortex. *Proceedings of the IJCNN92* IV:43–48

Porat, M., Zeevi, Y. Y. Localized Texture Processing in Vision: Analysis and Synthesis in the Gaborian Space. *IEEE Transactions on Biomedical Engineering* 36:115–129 (1989).

Rosenfeld, A., Ed. *Multiresolution Image Processing and Analysis.* Springer Verlag, Berlin (1984).

Sajda, P. and Finkel, L. H. A Neural Network Model of Object Segmentation and Feature Binding in Visual Cortex. IEEE (1992).

Wenskay, D. J. Neural Networks: A Prescription for Effective Protection. Computer Lawyer 8:12–23 (1989).

What is claimed is:

1. A method for preprocessing an image for a machine vision system which receives signals generated from the image, the method comprising the steps of:
   (1) top-down preprocessing the image, the step of top-down preprocessing the image including:
      (a) dividing the image into subimages, wherein each subimage is contained in a receptive field of the machine vision system;
      (b) applying processing operators to signals generated from each subimage to compute the centroid of each subimage;
      (c) translating the subimage so that the centroid of each subimage is centered in its receptive field;
      (d) applying a function to signals generated from each subimage to extract micro-features;
      (e) determining whether a stopping criterion is fulfilled for each subimage; and
      (f) repeating steps (a)–(e), using the subimage as the image in step (a) for each subimage determined not to fulfill the stopping criterion;
   (2) adaptive filter preprocessing the image to extract micro-features; and
   (3) feature binding to group the micro-features extracted using the top-down preprocessing and the micro-features extracted using the adaptive filter preprocessing to obtain macro-features.

2. The method of claim 1, wherein the micro-features comprise edge, texture, line end and curvature information.

3. The method of claim 1, wherein the function is a Gabor function.

4. The method of claim 1, wherein the stopping criterion is a function of an overall system performance and a change in system performance chances a scale of said receptive field.

5. The method of claim 1, wherein the stopping criterion is a function of a change in texture operators measured with respect to a scale across the image.

6. The method of claim 1, wherein the stopping criterion is a function of a change in texture operators measured with respect to a location across the image.

7. The method of claim 1, wherein the step of top-down preprocessing the image further includes:
   (g) determining an overall system performance;
   (h) determining whether said overall system performance is satisfactory; and
   (i) if said overall system performance is determined not to be satisfactory, changing a scale of the function in step (d) and repeating steps (a)–(h).

8. The method of claim 7, wherein the stopping criterion is based on said overall system performance, and a change in said overall system performance changes a scale of said receptive field.

9. The method of claim 1, wherein the adaptive filter preprocessing comprises extracting the micro-features using a neural network.

10. The method of claim 1, wherein the adaptive filter preprocessing comprises extracting the micro-features using a multi-layer DYSTAL.

11. The method of claim 1 further comprising the step of:
    calculating centroid coordinates of the macro-features and relative coordinates of the micro-features.

12. The method of claim 1, wherein the machine vision system comprises a preprocessor for performing the method, the method further comprising the steps of:
    inputting a feedback signal for the preprocessor; and
    modifying the steps of top-down preprocessing, adaptive filter preprocessing, and feature binding based on the feedback signal.

13. The method of claim 12, wherein the step of modifying the step of top-down preprocessing based on the feedback signal comprises increasing resolution of the receptive field.

14. The method of claim 1, the method further comprising the step of:
    texture preprocessing the image to extract micro-features; and
    wherein the step of feature binding further comprises grouping the micro-features extracted using the top-down preprocessing, the adaptive filter preprocessing, and the texture preprocessing to obtain macro-features.

15. A preprocessor for a machine vision system, the preprocessor comprising:
    a top-down preprocessor comprising:
       computing means for computing a centroid of an image;
       translating means for translating the image about the centroid to provide a centered image;
       extracting means for extracting micro-features from the centered image;
       stopping means for stopping further processing of the image, wherein the stopping means provides a stopping signal if a stopping criterion is fulfilled; and
       subdividing means for selectively subdividing the image into a plurality of subimages, wherein each one of the subimages is supplied to the computing means as the image, and wherein the subdividing means is responsive to the stopping signal to not perform any further subdivision of the image;
    an adaptive filter preprocessor for processing the image to extract micro-features; and
    a feature binder for grouping the micro-features extracted using the top-down preprocessing and the micro-features extracted using the adaptive filter preprocessing to obtain macro-features.

16. A method for preprocessing an image for a machine vision system which receives signals generated from the image, the machine vision system having a preprocessor for performing the method, the method comprising:

(1) top-down preprocessing the image, the step of top-down preprocessing the image including:

(a) extracting micro-features from the image;

(b) determining if a stopping criterion corresponding to the feature has been fulfilled; and (c) if the stopping criterion has not been fulfilled, dividing the image into a plurality of subimages; and (d) repeating steps (a)–(c) for each one of the plurality of subimages using each one of the plurality of subimages as the image in step (a); adaptive filter preprocessing the image to extract micro-features; and (2) feature binding to group the micro-features extracted using the top-down preprocessing to obtain macro-features;

(3) inputting a feedback signal for the preprocessor; and (4) modifying the steps of top-down preprocessing and feature binding based on the feedback signal.

17. The method of claim 16, wherein the feedback signal increases the resolution for exacting micro-features from the image in the step of top-down preprocessing.

* * * * *